United States Patent Office 3,151,094
Patented Sept. 29, 1964

3,151,094
GRINDELIA EXTRACT FOR SYNTHETIC RUBBER
William R. Peterson and Ralph E. McNay, Baytown, Tex., assignors, by mesne assignments, to Ashland Oil & Refining Company, Ashland, Ky., a corporation of Kentucky
No Drawing. Filed Dec. 12, 1960, Ser. No. 75,115
7 Claims. (Cl. 260—27)

This invention relates to the processing of synthetic rubber-like polymers. More particularly, it relates to a method of improving the processing characteristics of synthetic rubber-like polymers and the products obtained thereby.

In recent times, various types of synthetic rubber-like polymers have been prepared as potential replacements for natural rubber. Some of these have been received with enthusiasm while still others, in spite of their excellent physical characteristics, have met with difficulties because of poor mill processing behavior and/or lack of tack. For instance, stereoregular polybutadiene high in cis-1,4 structure is known to possess the excellent physical properties generally attributable to polybutadiene by whatever method prepared. Nevertheless, it is especially difficult to process particularly at temperatures above 110° F. Not only does the polymer band ineffectively and bank poorly on the mill, but the incorporation of pigments therein is not readily accomplished. Although these properties can be improved to some degree by milling cis-1,4 polybutadiene in the presence of a softener, any improvement demonstrated is marginal at best. Processing behavior has also been shown to be enhanced at above 110° F. by blending the polymer with natural rubber. The obvious drawback to this approach, however, is that any improvement realized is attained at the expense of using the very product which the polymer is intended to replace. Other synthetic rubber-like polymers are similarly plagued to one degree or another. For instance, while styrene-butadiene polymers usually can be readily compounded on a mill when the polymer Mooney viscosity is below about 35 ML-4, at increasingly higher Mooney levels milling becomes progressively more difficult.

It is a principal object of this invention, therefore, to provide a method for improving the characteristics of synthetic rubber-like polymers, particularly difficult to process polybutadiene and high Mooney styrene-butadiene polymers. It is a further object of this invention to provide a method for improving the mill processing behavior of such polymers. It is a still further object of this invention to provide a method for imparting to such polymers an improved quality of tack. Another object of this invention is to obtain such improved characteristics without sacrificing other polymer properties. Another object is to render such improvements by a method which is simple and economical.

In accordance with this invention, these objects have been met in a surprisingly effective manner. In general, the method of this invention comprises processing a synthetic rubber-like polymer in the presence of an effective amount of a processing aid derived from the plant Grindelia, whereby improved processing and/or tack characteristics of a nature heretofor unattainable are imparted thereto. More particularly, the method comprises incorporating in the polymer a processing aid which comprises an extract of the plant Grindelia which is soluble in both alcohol and hydrocarbon solvents.

The plant Grindelia from which the processing aid of the method of this invention is derived belongs to the tribe Asteroideae of the natural family Compositae. The genus Grindelia includes some 25 known species, six or eight of which are found in South America. The remainder occur in the United States mostly west of the Mississippi River, generally in arid and semi-arid plateau regions, although certain species also appear in regions where rain-fall is more plentiful. A particularly prevalent plant in the United States is the specie G. squarrosa, commonly referred to as "curly cup gumweed." Other well known species are G. humilis, G. camporum, G. robusta, G. nana, G. fastigiata, G. perennis and G. blakei, among others. The various species are perennial or biennial and produce, in varying amounts depending on the specie, a sticky resinous substance on the stem and leaves and especially on the flower heads. From this characteristic is derived the common name "gum plant" or "gum weed." Extracts of the plant have been shown to exhibit some utility in certain areas of the pharmaceutical field, but beyond this there has apparently been no further investigation of the plant for any purpose.

The processing aid employed in the method according to the present invention may be obtained from the plant Grindelia by conventional extraction means. Thus, the finely pulverized plant including leaves, flower heads and stems, is simply leached by percolating therethrough any common hydrocarbon solvent such as VM&P naphtha. The extract is a soft, light amber colored, resinous substance which is substantially soluble in alcohol. This resinous substance as such, or as a water soluble salt thereof such as the sodium, potassium and ammonium salts, is incorporated in the polymer in any of various ways as subsequently described herein. It has been shown, however, that the extract contains approximately 10% of an alcohol-insoluble material which, if separated as by subjecting the resinous substance to further extraction, renders the residual material an even superior processing aid. It is a preferred embodiment of this invention, therefore, to employ as a processing aid a hydrocarbon solvent extract of the plant Grindelia which has been purified by further extraction with alcohol.

The following example illustrates the extraction of the plant Grindelia. All parts are by weight unless otherwise noted.

*Example 1*

1000 parts of the whole plant G. squarrosa are pulverized with a hammer mill and subjected to extraction by simple percolation at room temperature with 2000 parts of commercially available VM&P naphtha. After 30 minutes, the resultant slurry is filtered and the filtrate subjected to distillation to remove the solvent, leaving 120 parts of a resinous substance. 100 parts of the resinous substance is then dissolved in 900 parts of methyl alcohol and the resultant slurry filtered to give 92 parts of purified product. The water soluble salts of the product may be obtained in a conventional manner.

Although the method of the present invention is particularly applicable to improving the processability and tack of stereoregular polybutadiene high in cis-1,4 structure, other synthetic rubber-like polymers may also be similarly treated so as to exhibit the same advantages to varying degrees. Thus, the method may also be practiced on polymers prepared by the emulsion polymerization of a polymerizable ethylenic compound either by itself or with one or more different polymerizable ethylenic compounds. By ethylenic compounds is meant, for example, conjugated diolefins such as butadiene-1,3, methyl-2-butadiene-1,3, chloro-2-butadiene-1,3, piperylene, 2,3-dimethyl butadiene-1,3, and the like; aryl olefins such as styrene, vinyl naphthlene, α-methylstyrene, p-chlorostyrene, vinyl toluene, divinyl benzene and the like; α-methylene carboxylic acids, their esters, nitriles and amides such as acrylic acid, methyl acrylate, methylmethacrylate, acrylonitrile, methacrylonitrile, acrylamide, methacrylamide and the like; vinyl aliphatic compounds such as the vinyl halides, vinyl acetate, methyl vinyl ether, methyl vinyl ketone and the like; and vinylidene compounds such as the vinylidene halides. Other well-known synthetic rubber-like polymers such as butyl rubber, silicone rubbers, chlorosulfonated polyethylene elastomers, poly urethane elastomers, fluoro elastomers, ethylene-propylene copolymers, and the like may also be treated with advantage according to the method of this invention. Accordingly, as used throughout the specification and claims, the term synthetic rubber-like polymer is intended to include all of the above.

The amount of processing aid employed in accordance with this invention may be quite widely varied. The actual amount employed in any particular case will depend to some extent on the polymer being treated. In general, it can be stated that the amount of processing aid may be as little as about 1 or 2% on the weight of the polymer under which conditions a decided advantage is exhibited even with extremely difficult to process polymers such as stereoregular cis-1,4 polybutadiene. Usually the practice will be to employ the processing aid in amounts ranging considerably higher, even as high as about 25 or 30% by weight. In most instances, however, the processing aid will be employed in an amount of about 5–15% on the weight of the polymer, in which range a decided improvement will be exhibited in process milling and/or tack properties and/or, in some instances, physical properties of the subsequently compounded and/or vulcanized products.

The mode of addition of the processing aid to the synthetic rubber-like polymer may take various forms and may depend to some extent on the particular polymer being treated. As in the use of conventional softeners, the processing aid of this invention may be readily added directly to the polymer on the mill. Alternatively, the processing aid in its liquid form or dissolved in a hydrocarbon solvent may be sprayed or otherwise applied to the polymer. In the case of emulsion polymers, the processing aid may be added directly to the latex prior to coagulation, it being incorporated in the polymer as it is coagulated and separated. In solvent polymerization systems, the hydrocarbon soluble processing aid may be added directly to the solvent system for incorporation into the resultant polymer. Any or all of these or other methods of addition may be employed in the practice of this invention.

The following examples further illustrate the invention. All parts are by weight unless otherwise noted. In these examples, the polymers are observed during treatment as to milling behavior, i.e., the ability to mill readily and easily without bagging and without excessive sticking. In addition, the milled polymers are observed as to their property of tack, i.e., that characteristic which causes a polymer to adhere to itself which is so essential in the construction of composite articles such as tires. The milled polymers are also observed as to their property of extrusion, i.e., that ability to extrude uniformly with a smooth surface and with sharp edges.

*Example 2*

100 parts of a stereoregular polybutadiene high in cis-1,4 structure having a Mooney viscosity of 40 ML–4 are passed twice, without banding, through a 6 x 12 inch roll set at 0.008 inch and maintained at a temperature of 60–80° F. The polymer is then banded on the front roll with the mill set at 0.055 inch and ¾ cuts made from alternate sides at 30 second intervals for a period of two minutes. 10 parts of the resinous material of Example 1 are then added evenly across the mill over an additional two minute period followed by the addition at a uniform rate of 50 parts of carbon black. The mill is opened to 0.065 inch after half of the black is added and one ¾ cut made from each side. Addition of the black requires 12 minutes. The mill is then opened to 0.075 inch and a ¾ cut made from each side. The following compounding ingredients are then added over a period of four minutes:

| Ingredient: | Parts |
|---|---|
| Zinc oxide | 12 |
| Sulfur | 7 |
| Stearic acid | 4 |
| Antioxidant | 4 |
| Accelerator | 3.6 |

After addition is complete, three ¾ cuts are made each way over a period of two minutes. The batch is then cut from the mill, the mill set at 0.030 inch, and the rolled strip passed through the mill endwise six times over a two minute period. The mill is then opened to 0.25 inch and the stock passed through four times in 30 seconds, the stock being folded back on itself each time. The mill processing behavior of the polymer is excellent. It bands well, is free of bagging and readily accepts the carbon black. The tack of the milled polymer is excellent. The same polymer processed in the absence of the resinous material of Example 1 exhibits only fair mill behavior accompanied by some shredding and a tendency to bag. The milled polymer is substantially devoid of tack.

*Example 3*

The procedure of Example 2 is repeated except that the mill temperature is maintained at 120–130° F. The mill processing behavior of the polymer is excellent. Milling is readily accomplished without bagging and with proper banding. The tack of the milled stock is excellent and it extrudes smoothly. When mill processing of the polymer is attempted under the same conditions but in the absence of the resinous product of Example 1, it is impossible to mill the polymer.

*Example 4*

100 parts of the polymer of Example 2 are dissolved along with 10 parts of the resinous product of Example 1 in 2000 parts of benzene. The solvent is then evaporated and the resinous product-bearing polymer milled under the conditions of Example 3 except that no additional processing aid is incorporated. The milling behavior of the stock proves to be even superior to that observed in Example 3. The milled polymer exhibits unusual tackiness and extrudibility.

*Example 5*

The procedure of Example 3 is repeated except that the resinous product of Example 1 is added in the form of the sodium salt. Similar results are obtained.

*Example 6*

10 parts of the product of Example 1 are dissolved in 100 parts of VM&P naphtha and the resultant solution evenly sprayed on 100 parts of the polymer crumb of Example 2. The treated polymer is then milled under the conditions of Example 3 except that no further addition of processing aid is made. Similar processing and tack improvements are noted as in Example 3.

*Example 7*

The procedure of Example 3 is repeated using the resinous products of the plants *G. camporum* and *G. robusta* obtained by the extraction procedure employed in Example 1. In each instance, similar improved milling and tack properties are observed.

*Example 8*

The procedure of Example 3 is repeated using 1, 5, 7.5 and 15 parts of the resinous product of Example 1. In each instance improved processing, tack and extrusion properties are observed although at the lower concentration the improvement is not as pronounced as at the higher concentration.

Example 9

The procedure of Example 3 is repeated except that 100 parts of an emulsion polymerized polybutadiene polymer of 32 ML-4 Mooney viscosity and 5 parts of the resinous product of Example 1 are employed. The polymer exhibits substantially improved milling, tack and extrusion properties and accepts pigments far better than does a processing aid-free polymer.

Example 10

The procedure of Example 9 is repeated except that the carbon black and the resinous processing aid are incorporated in the polymer by being added to the latex. The latex is then coagulated, washed and dried. On milling of the resultant masterbatch, similar improved properties are observed.

Example 11

A 70 ML-4 Mooney viscosity styrene-butadiene latex prepared at 41° F. using a mixed fatty-rosin acid soap system is masterbatched in sufficient quantity with 75 parts of carbon black to give, when coagulated, a black masterbatch containing 100 parts of polymer. The milling procedure of Example 3 is repeated using 7.5 parts of the resinous product of Example 1, 10 parts of zinc oxide, 2 parts of sulfur and 1.75 parts of benzothiazyldisulfide. A smooth milling performance is obtained considerably superior to that obtained in the absence of the processing aid of this invention.

Example 12

To 100 parts of Neoprene W (E. I. du Pont de Nemours & Co. polychloroprene) broken down by milling at 120° F. for two minutes is added on the mill 5 parts of the product of Example 1 over five minutes and 29 parts of carbon black over ten minutes. The following additional compounding ingredients are then added over a further ten minute period of milling.

| Ingredient: | Parts |
| --- | --- |
| Magnesium oxide | 4 |
| Antioxidant | 1 |
| Zinc oxide | 5 |
| Stearic acid | 0.5 |
| Accelerator | 0.5 |

Both mill processing of the polymer and tack of the milled polymer are superior to the same properties of the identical polymer having none of the processing aid of this invention incorporated therein.

Example 13

100 parts of Hypalon 20 (E. I. du Pont de Nemours & Co. chlorosulfonated polyethylene) is milled as in Example 12 using the following compounding ingredients.

| Ingredient: | Parts |
| --- | --- |
| Litharge | 40 |
| Carbon black | 35 |
| Benzothiazyldisulfide | 0.75 |
| Accelerator | 0.75 |
| Product of Example 1 | 7.5 |

Improved mill processing and significant improvement in tack are noted as compared to a polymer not having incorporated therein the processing aid of this invention. Improvement in extrusion properties are also noted.

Example 14

100 parts of Viton-A (E. I. du Pont de Nemours & Co. vinylidene fluoride copolymer) is milled as in Example 12 but on a cold mill at 60–75° F. using the following compounding ingredients.

| Ingredient: | Parts |
| --- | --- |
| Magnesium dioxide | 15 |
| Carbon black | 25 |
| Curing agent | 1.5 |
| Product of Example 1 | 5 |

As compared to processing the polymer in the absence of the processing aid of this invention, the results obtained herein are vastly superior. Mill processing is characterized by considerably less tendency to go to the back roll and to stick to the rolls. Pigment acceptance is much faster and smoother.

Example 15

100 parts of EPR-22 (Hercules Powder Company ethylene-propylene copolymer) is milled as in Example 12 using the following compounding ingredients.

| Ingredient: | Parts |
| --- | --- |
| Carbon black | 50 |
| Dicumyl peroxide | 4 |
| Sulfur | 2 |
| Vulcanizing agent | 2 |
| Red lead | 10 |
| Product of Example 1 | 5 |

The polymer processed more easily and the milled product exhibited considerably improved tack and gave a smoother extrusion as compared to the same polymer milled in the absence of the processing aid of this invention.

Example 16

100 parts of butyl rubber are milled as in Example 12 using the following compounding ingredients.

| Ingredient: | Parts |
| --- | --- |
| Carbon black | 50 |
| Zinc oxide | 5 |
| Stearic acid | 2 |
| Sulfur | 1.25 |
| Accelerator | 1.5 |
| Mercaptobenzothiazole | 1.0 |
| Product of Example 1 | 5 |

The polymer milled more smoothly with no tendency to bag as compared to the same polymer containing no processing aid while pigment acceptance is rapid and tack of the milled product is superior.

Example 17

100 parts of Adiprene C (E. I. du Pont de Nemours & Co. polyurethane) is milled as in Example 12 using the following compounding ingredients.

| Ingredient: | Parts |
| --- | --- |
| Carbon black | 30 |
| Benzothiazyldisulfide | 4 |
| Mercaptobenzothiazole | 1 |
| Curing agent | 10 |
| Product of Example 1 | 10 |

Milling performance is superior to that obtained in the absence of processing aid. Additionally, improved extrudibility is observed in the milled product.

Example 18

The preceding examples in which carbon black is incorporated are repeated except that the carbon black is omitted. The white rubber products thus obtained exhibit similar improved properties to those containing carbon black.

As previously noted herein, it has heretofore been the practice to improve the processing characteristics of polybutadiene high in cis-1,4 structure by blending it with natural rubber. While an improvement is thus obtained, an even greater improvement is obtained by incorporating in the blend the processing aid of this invention as illustrated by the following examples.

Example 19

10 parts of natural rubber are broken down on a mill at 120–130° F. until it bands well. 90 parts of a polybutadiene high in cis-1,4 structure are then slowly added until a homogeneous stock is obtained. The procedure of Example 3 is then followed. The mill behavior of the blend and the tack of the milled polymer are superior to those observed in a polymer treated in the absence of the processing aid of this invention.

Example 20

When Example 19 is repeated with natural rubber/cis-1,4 polybutadiene blends of 25/75 and 50/50 improved processing aid tack properties are noted.

We claim:

1. In the processing of a solid synthetic rubber polymer, the method of imparting improved processing characteristics to said polymer which comprises: adding to the polymer as a processing aid about 1.0–30% by weight of the polymer of a hydrocarbon soluble extract of the plant Grindelia obtained by extracting said plant with a hydrocarbon, and processing the resultant mixture comprising said solid polymer and said processing aid.

2. In the processing of a solid synthetic rubber polymer, the method of imparting improved processing characteristics to said polymer which comprises: adding to the polymer as a processing aid about 1.0–30% by weight of the polymer of a hydrocarbon soluble-alcohol soluble extract of the plant Grindelia obtained by extracting said plant with a hydrocarbon and then extracting the resulting hydrocarbon soluble extract with an alcohol, and processing the resultant mixture comprising said solid polymer and said processing aid.

3. The process of claim 1 in which the amount of processing aid is about 5.0–15% by weight of said polymer.

4. The process of claim 1 in which the extract is employed as a salt selected from the group consisting of the alkali metal and ammonium salts.

5. The process of claim 1 in which the polymer is stereoregular polybutadiene.

6. The process of claim 5 in which the stereoregular polybutadiene is blended with about 10–50% by weight of natural rubber.

7. The process of claim 1 in which the polymer is a styrene-butadiene polymer having a Mooney viscosity value greater than about 35 ML-4.

References Cited in the file of this patent

UNITED STATES PATENTS

| | | |
|---|---|---|
| 2,384,910 | Hanson et al. | Sept. 18, 1945 |
| 2,556,575 | Cubberley et al. | June 12, 1951 |
| 2,822,341 | Miller et al. | Feb. 4, 1958 |
| 2,868,741 | Chambers et al. | Jan. 13, 1959 |
| 2,956,973 | Holdsworth | Oct. 18, 1960 |